United States Patent
Bronson et al.

(10) Patent No.: US 9,292,445 B2
(45) Date of Patent: *Mar. 22, 2016

(54) NON-DATA INCLUSIVE COHERENT (NIC) DIRECTORY FOR CACHE

(71) Applicant: International Business Machines Corporation, Armonk, NY (US)

(72) Inventors: Timothy C. Bronson, Round Rock, TX (US); Garrett M. Drapala, Poughkeepsie, NY (US); Rebecca M. Gott, Poughkeepsie, NY (US); Pak-kin Mak, Poughkeepsie, NY (US); Vijayalakshmi Srinivasan, New York, NY (US); Craig R. Walters, Highland, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 14/501,437

(22) Filed: Sep. 30, 2014

(65) Prior Publication Data

US 2015/0058569 A1    Feb. 26, 2015

Related U.S. Application Data

(63) Continuation of application No. 13/784,958, filed on Mar. 5, 2013.

(51) Int. Cl.
*G06F 12/08* (2006.01)

(52) U.S. Cl.
CPC ........ *G06F 12/0833* (2013.01); *G06F 12/0811* (2013.01); *G06F 12/0831* (2013.01); *G06F 2212/283* (2013.01); *G06F 2212/621* (2013.01)

(58) Field of Classification Search
None
See application file for complete search history.

(56) References Cited

U.S. PATENT DOCUMENTS

| | | | |
|---|---|---|---|
| 7,085,898 B2 | 8/2006 | Blake et al. | |
| 7,266,587 B2* | 9/2007 | Rowlands | 709/214 |
| 7,552,288 B2 | 6/2009 | Iyer et al. | |
| 2003/0005237 A1* | 1/2003 | Dhong et al. | 711/146 |
| 2007/0113022 A1* | 5/2007 | Abraham et al. | 711/144 |

(Continued)

OTHER PUBLICATIONS

Zhao et al; "NCID: A Non-Inclusive Cache, Inclusive Directory Architecture for Flexible and Efficient Cache Hierarchies"; Proceedings of the 7th ACM International Conference on Computing Frontieirs, 2010, pp. 121-130.

*Primary Examiner* — Adam M Queler
*Assistant Examiner* — Alex Olson
(74) *Attorney, Agent, or Firm* — Cantor Colburn LLP; Margaret McNamara

(57) ABSTRACT

Embodiments relate to a non-data inclusive coherent (NIC) directory for a symmetric multiprocessor (SMP) of a computer. An aspect includes determining a first eviction entry of a highest-level cache in a multilevel caching structure of the first processor node of the SMP. Another aspect includes determining that the NIC directory is not full. Another aspect includes determining that the first eviction entry of the highest-level cache is owned by a lower-level cache in the multilevel caching structure. Another aspect includes, based on the NIC directory not being full and based on the first eviction entry of the highest-level cache being owned by the lower-level cache, installing an address of the first eviction entry of the highest-level cache in a first new entry in the NIC directory. Another aspect includes invalidating the first eviction entry in the highest-level cache.

11 Claims, 19 Drawing Sheets

(56) References Cited

U.S. PATENT DOCUMENTS

| | | |
|---|---|---|
| 2007/0168619 A1 | 7/2007 | Hutton et al. |
| 2009/0094418 A1* | 4/2009 | Warner et al. .................. 711/144 |
| 2010/0274971 A1* | 10/2010 | Solihin ......................... 711/122 |
| 2011/0055458 A1* | 3/2011 | Kuehne ......................... 711/103 |
| 2011/0138128 A1* | 6/2011 | Chen et al. .................... 711/130 |
| 2011/0320738 A1 | 12/2011 | Blake et al. |
| 2012/0159073 A1* | 6/2012 | Jaleel et al. ................... 711/122 |
| 2013/0254488 A1* | 9/2013 | Kaxiras et al. ................ 711/130 |

* cited by examiner

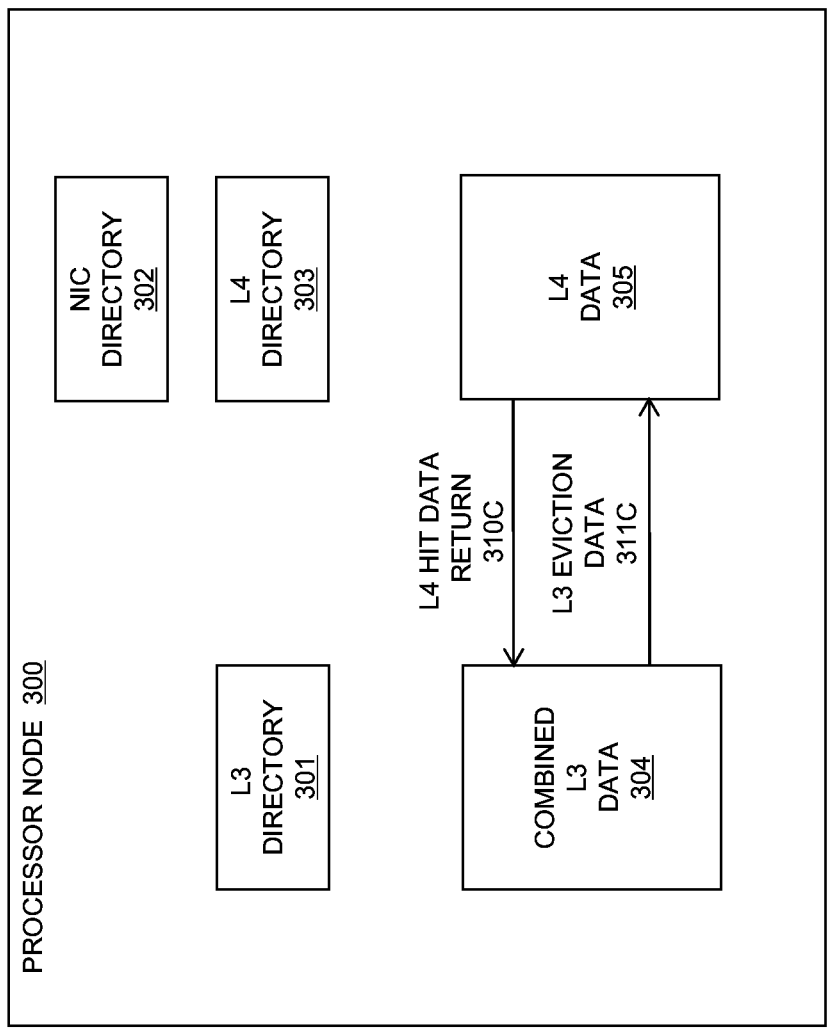

L4 CACHE IS FULL AND EVICTION IS NEEDED FROM L4 CACHE TO MAKE SPACE FORE A NEW ENTRY; NIC HAS SPACE FOR NEW ENTRY
1101

SELECT AN ENTRY FROM L4 LRU FOR EVICTION TO NIC:
1. AN L3 EXCLUSIVE ENTRY; OR
2. A SHARED ENTRY WITH IM TAG = 0 ENTRY; OR
3. A SHARED ENTRY WITH IM TAG = 1 ENTRY
1102

INSTALL SELECTED ENTRY IN NIC DIRECTORY
1103

INVALIDATE SELECTED ENTRY IN L4 CACHE
1104

NON-DATA INCLUSIVE COHERENT (NIC) DIRECTORY FOR CACHE

CROSS-REFERENCE TO RELATED APPLICATION

This application is a continuation of U.S. application Ser. No. 13/784,958 (Bronson et al.), filed on Mar. 5, 2013, which is herein incorporated by reference in its entirety.

BACKGROUND

The present invention relates generally to a cache for a computer processor, and more specifically, to a cache including a non-data inclusive coherent (NIC) directory.

A symmetric multiprocessor (SMP) is a computer system that includes a plurality of processor nodes that are linked by one or more SMP buses. A computer system, such as an enterprise server computer system, may include multiple processor sockets that are interconnected in a SMP bus topology so as to achieve a relatively large overall processor capacity. Each processor node in a SMP includes a cache subsystem; a robust cache subsystem may be critical to good performance of a SMP. A relatively large SMP may have high traffic on the SMP bus, including snoops, which is a request for data by a processor node that is sent to the other processor nodes in the SMP, and cache-to-cache interventions, in which data migrates from one processor node to another. A snoop may require that a processor node interrogate a lower-level cache in the processor node to determine if the data requested by the snoop exists in the processor node. Such lower-level cache interrogations may interfere with core performance in the processor node.

An inclusive cache policy may be used in a multi-level cache hierarchy, allowing the highest-level cache to filter out snoops from the SMP bus when the requested data does not reside in the lower-level caches in the processor node. However, an inclusive cache policy may be relatively inefficient in use of available cache bits in the highest-level cache, as, in an inclusive cache, the highest-level cache holds the same data, or older versions of the data, that resides in the lower level caches. A victim highest-level cache that includes copies of the lower-level cache directories may also be used. However, such a caching structure requires a relatively large amount of space for the copied directories, and may also have relatively long shared intervention latency with owned data that is returned from a lower-level cache.

SUMMARY

Embodiments include a method and computer program product for a non-data inclusive coherent (NIC) directory for a symmetric multiprocessor (SMP) of a computer. An aspect includes determining a first eviction entry of a highest-level cache in a multilevel caching structure of the first processor node of the SMP. Another aspect includes determining that the NIC directory is not full. Another aspect includes determining that the first eviction entry of the highest-level cache is owned by a lower-level cache in the multilevel caching structure. Another aspect includes, based on the NIC directory not being full and based on the first eviction entry of the highest-level cache being owned by the lower-level cache, installing an address of the first eviction entry of the highest-level cache in a first new entry in the NIC directory. Another aspect includes invalidating the first eviction entry in the highest-level cache.

BRIEF DESCRIPTION OF THE SEVERAL VIEWS OF THE DRAWINGS

The subject matter which is regarded as embodiments is particularly pointed out and distinctly claimed in the claims at the conclusion of the specification. The foregoing and other features, and advantages of the embodiments are apparent from the following detailed description taken in conjunction with the accompanying drawings in which:

FIGS. 3A-D depict a processor node including a NIC directory in accordance with an embodiment;

FIG. 11 depicts a process flow for eviction of an entry from the L4 cache to the NIC directory in accordance with an embodiment;

DETAILED DESCRIPTION

Figure 1:
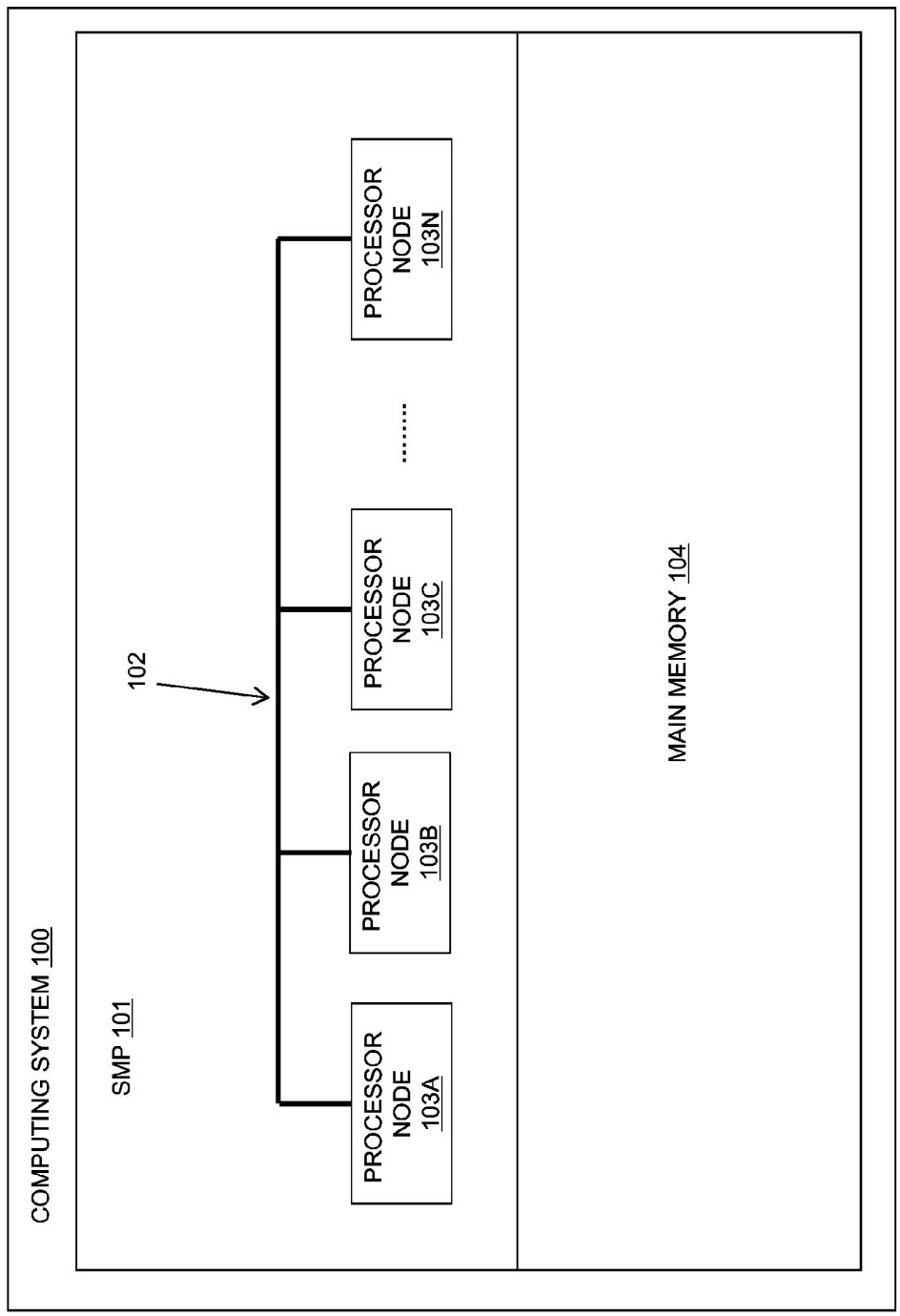
FIG. 1 depicts a computing system including a SMP in accordance with an embodiment.

Embodiments of a NIC directory for a cache are provided, with exemplary embodiments being discussed below in detail. The NIC directory is used in conjunction with a multi-level caching structure in a processor node in a SMP. The NIC directory tracks data residing in the lower-level caches that has particular ownership states. The NIC directory and highest-level cache filter snoops from other processor nodes in the SMP, reducing cross interrogations to the lower levels of the cache. The NIC directory holds entries including line addresses and ownership information, but no data. The highest-level cache also comprises a directory that holds entries including line addresses and ownership information; the highest-level cache additionally holds data that is associated with the lines in its directory. The NIC directory and highest-level cache act to capture and track data that is evicted from the lower-level caches to maintain an inclusive cache management policy, allowing snoop filtering, increased cache bit efficiency and relatively fast intervention of shared data on snoop hits. A NIC directory may have any appropriate size; the size of a NIC directory may be determined based on an amount of space available on a chip residing within the processor node.

In some embodiments, a NIC directory may reside adjacent to the highest-level cache in the multi-level caching structure. In further embodiments, the NIC directory may comprise an additional associative compartment of the cache directory, but without the corresponding data. The NIC directory tracks lines that are exclusively owned by a lower-level cache in the processor node. Because exclusively-owned data is likely to be modifed in the lower-level cache, storage of such line data in the highest-level cache may be wasteful. The NIC directory also tracks shared read-only data that may or may not be used for off-node cache shared interventions. The highest-level cache that is used in conjunction with the NIC directory may track evictions from the lower-level cache, regardless of whether the data in the evicted line has been modified or not, and also commonly shared lines to enable fast intervention to other processor nodes in the SMP. This allows the highest-level cache and the NIC directory to effectively filter out snooping and intervention traffic from other processor nodes.

In some embodiments, line addresses may be stored in both the NIC directory and in the highest-level cache directory based on an addressing scheme including a directory address tag, which is derived from a low address portion of the system address; a cache row, which is derived from a middle portion of the system address; and a byte offset comprising a targeted byte index within a cache line. The lines in the NIC and highest-level directories may further include the following fields: a validity bit that indicates whether entry is valid; an address tag that, when combined with the cache row field, is used to determine the full system address for directory hit/miss compares; an ownership tag which identifies which lower-level cache within the processor node has ownership of the entry, and whether the ownership is read-only or exclusive; an intervention master (IM) bit, which, if set (i.e., IM=1), indicates that the processor node will be sourcing the data on the next snoop fetch; and a shared or multiple copy (MC) bit which, if unset (i.e., MC=0), indicates that the processor node has the sole copy of the data (which implies the IM bit for the entry is set). The highest-level cache additionally holds data associated with the addresses its directory.

FIG. 1 illustrates an embodiment of a computing system 100 including a SMP 101. SMP 101 includes a plurality of processor nodes 103A-N that are linked by a SMP bus 102. Computing system 100 also includes a main memory 104, and may be any appropriate type of computing system. FIG. 1 is shown for illustrative purposes only; a SMP in a computing system may include any appropriate number of processor nodes having any appropriate configuration, and the processor nodes may be connected by any appropriate number and configuration of SMP buses. Each processor node 103A-N includes a multi-level caching structure including a NIC directory, which is described in further detail below. In order to exchange data between processor nodes 103A-N, snoops are sent by a requesting processor node of processor nodes 103A-N to the other processor nodes via the SMP bus 102. These snoops may be intercepted by the highest-level cache and the NIC directory in each of the receiving processor nodes 103A-N.

In various embodiments, a NIC directory may be used in conjunction with any appropriate multi-level caching structure; in some embodiments, the multi-level caching structure may comprise a 4-level cache structure. While the NIC directory is discussed below with respect to a 4-level caching structure, this is for illustrative purposes only. In embodiments comprising a 4-level caching structure, a L4 cache comprises the highest-level cache, and a plurality of L3, L2, and L1 caches are located below the L4 cache. In such embodiments, the L4 cache and NIC directory may be shared by all the L3 caches within the processor node, and may communicate directly with the SMP bus. A L4 cache may have a size of about 256 megabytes (MB) in some embodiments. The L3 cache may comprise a store-in cache that is shared by some number of cores, and may have a size of about 32 MB in some embodiments. In some embodiments, there may be three L3 shared caches in a node, for a total of up to 96 MB of unique data. In conjunction with a 256 MB L4 cache there may be up to 352 MB of unique data within the processor node. The L1 cache and L2 cache may comprise store-through caches that are private to a particular core in a processor node. In some embodiments, the NIC directory size may be smaller than the sum of the next lower-level cache directories, e.g., less than 96 MB.

Figure 2:
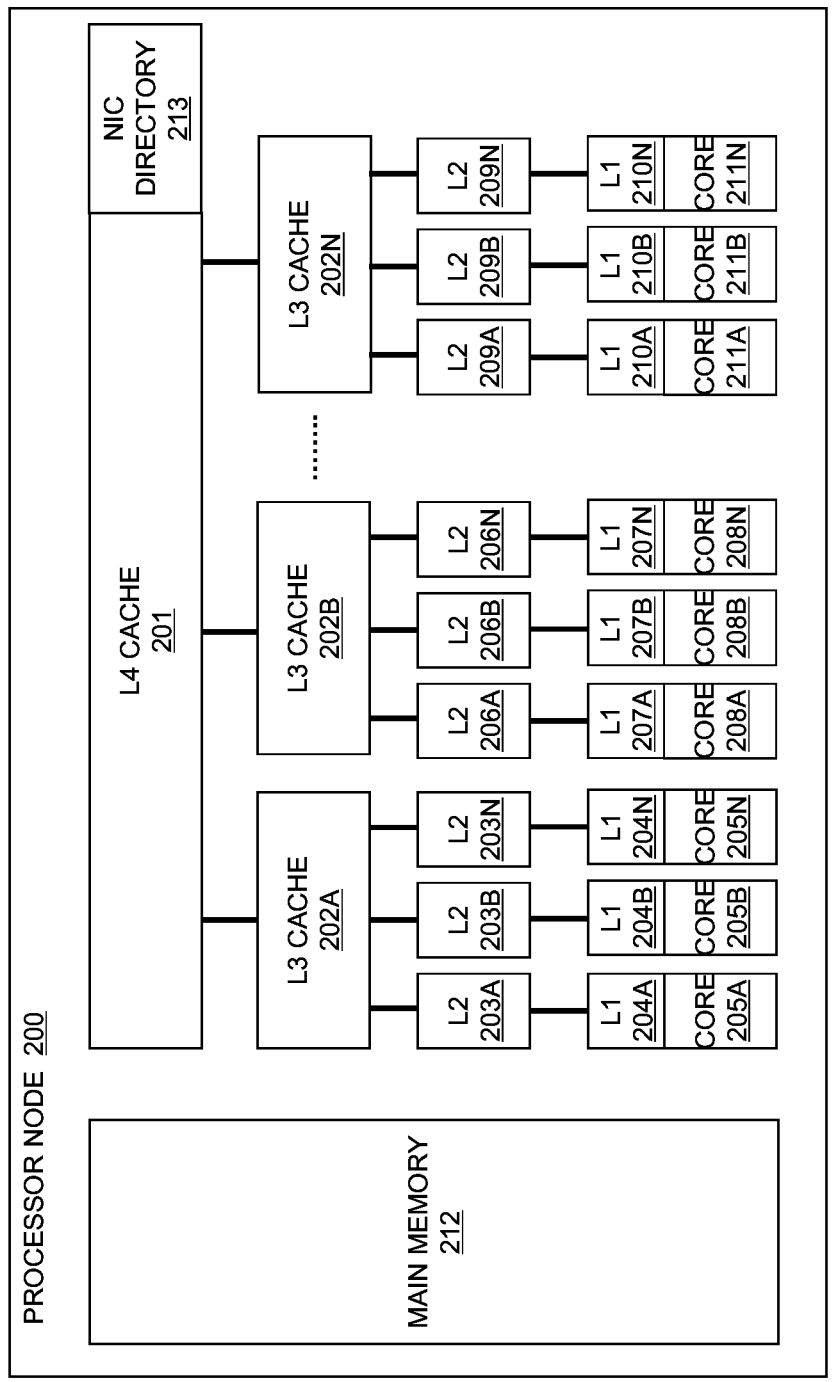
FIG. 2 depicts a processor node including a NIC directory in accordance with an embodiment.

FIG. 2 illustrates an embodiment of a processor node 200 including an NIC directory 213 and a 4-level caching structure. Processor node 200 includes L4 cache 201, which is the highest-level cache, in communication with multiple L3 caches 202A-N. L4 cache 201 includes a L4 directory that tracks addresses in L4 cache 201, and L4 data that is associated with the addresses. Each of L3 caches 202A-N include a respective L3 directory and L3 data. Each of L3 caches 202A-N is in communication with a lower-level caching structure including respective L2 caches 203A-N, 206A-N, and 209A-N, and L1 caches 204A-N, 207A-N, and 210A-N. The L2 caches 203A-N, 206A-N, and L1 caches 204A-N, 207A-N, and 210A-N are each assigned to a respective core of cores 205A-N, 208A-N, and 211A-N. NIC directory 213 is located next to L4 cache 201 and is also in communication with L3 caches 202A-N. NIC directory 213 tracks addresses, but does not store data. Main memory 212 may comprise a sub-address space of a main memory (for example, main memory 104 of FIG. 1) that is assigned to processor node 200. Processor node 200 may comprise any of the processor nodes 103A-N that are shown in FIG. 1. FIG. 2 is shown for illustrative purposes only; any appropriate number and configuration of cache levels, and caches within those levels, may be included in a processor node of a SMP. Further, a NIC directory such as NIC directory 213 may be located in any appropriate location within a processor node.

Figure 3A:
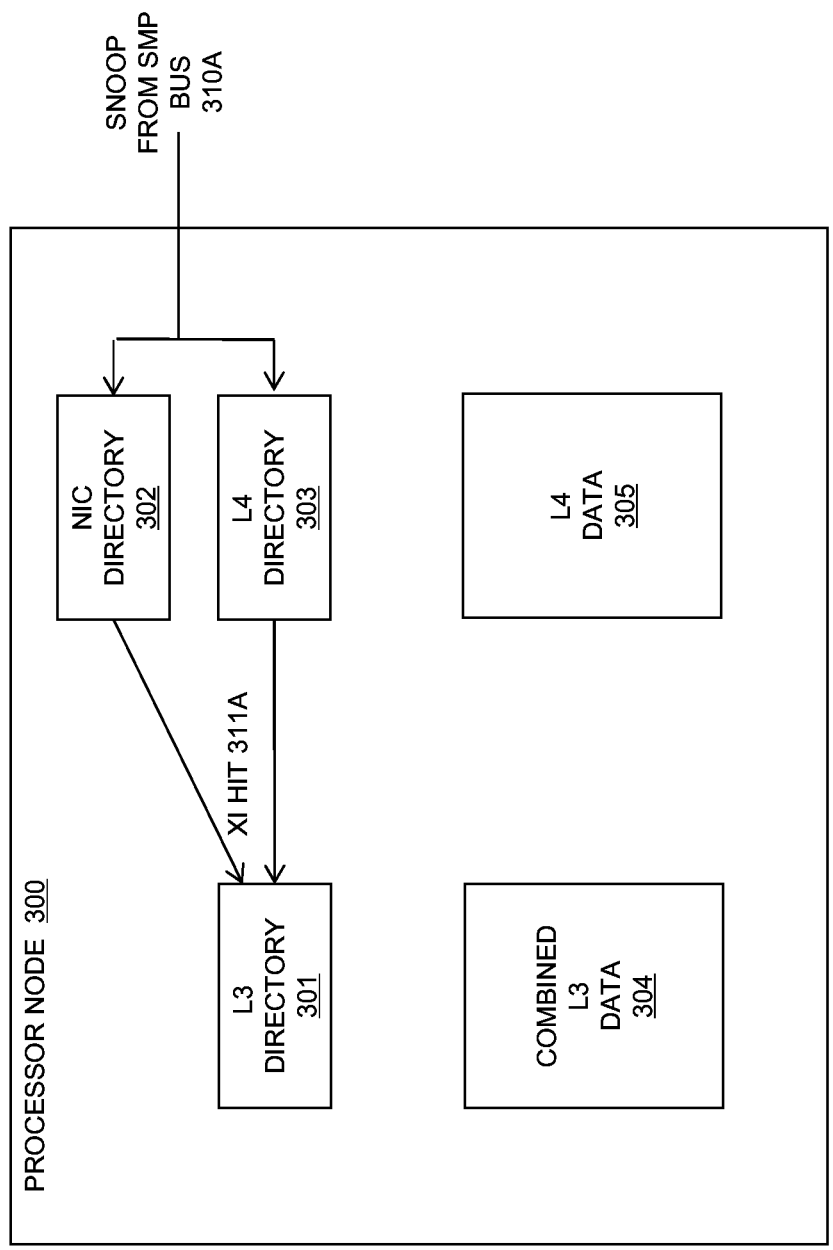
Figure 3B:
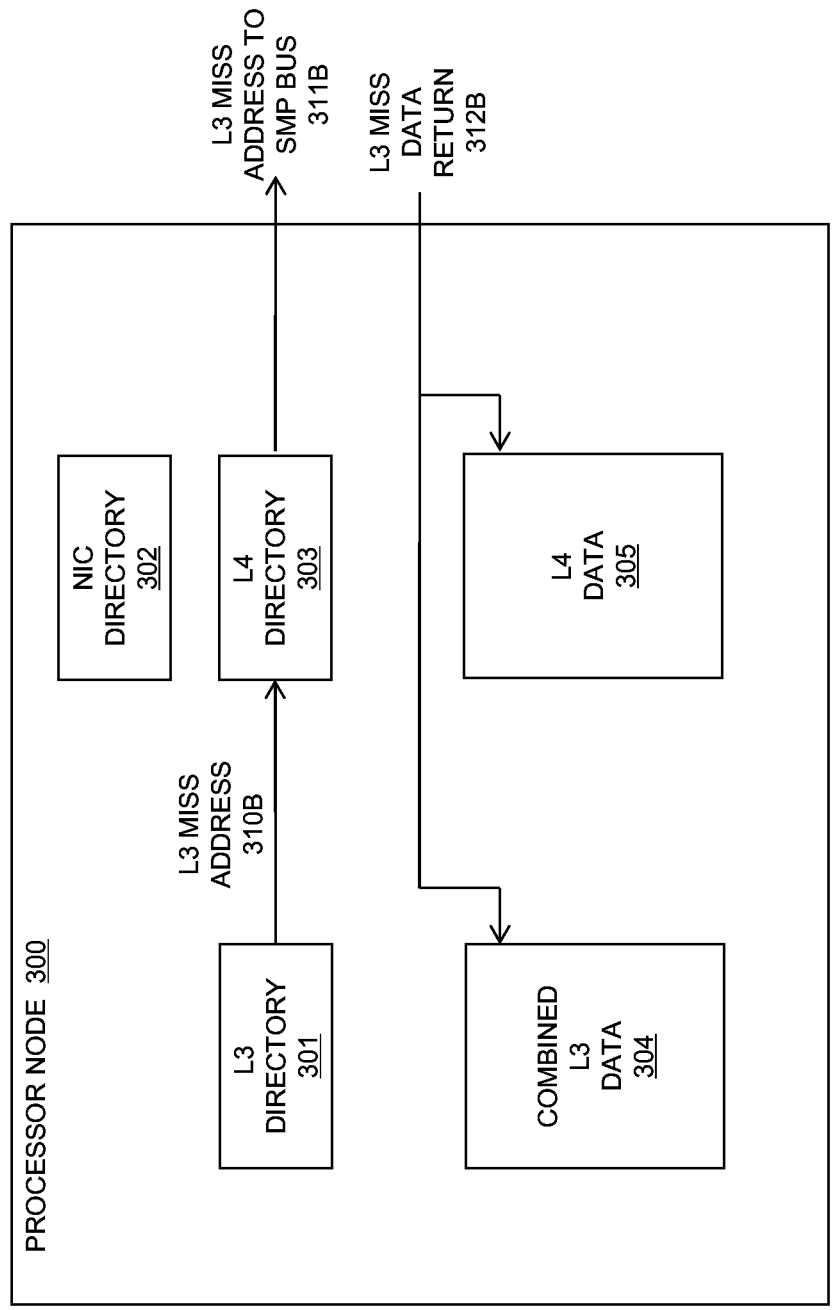
Figure 3D:
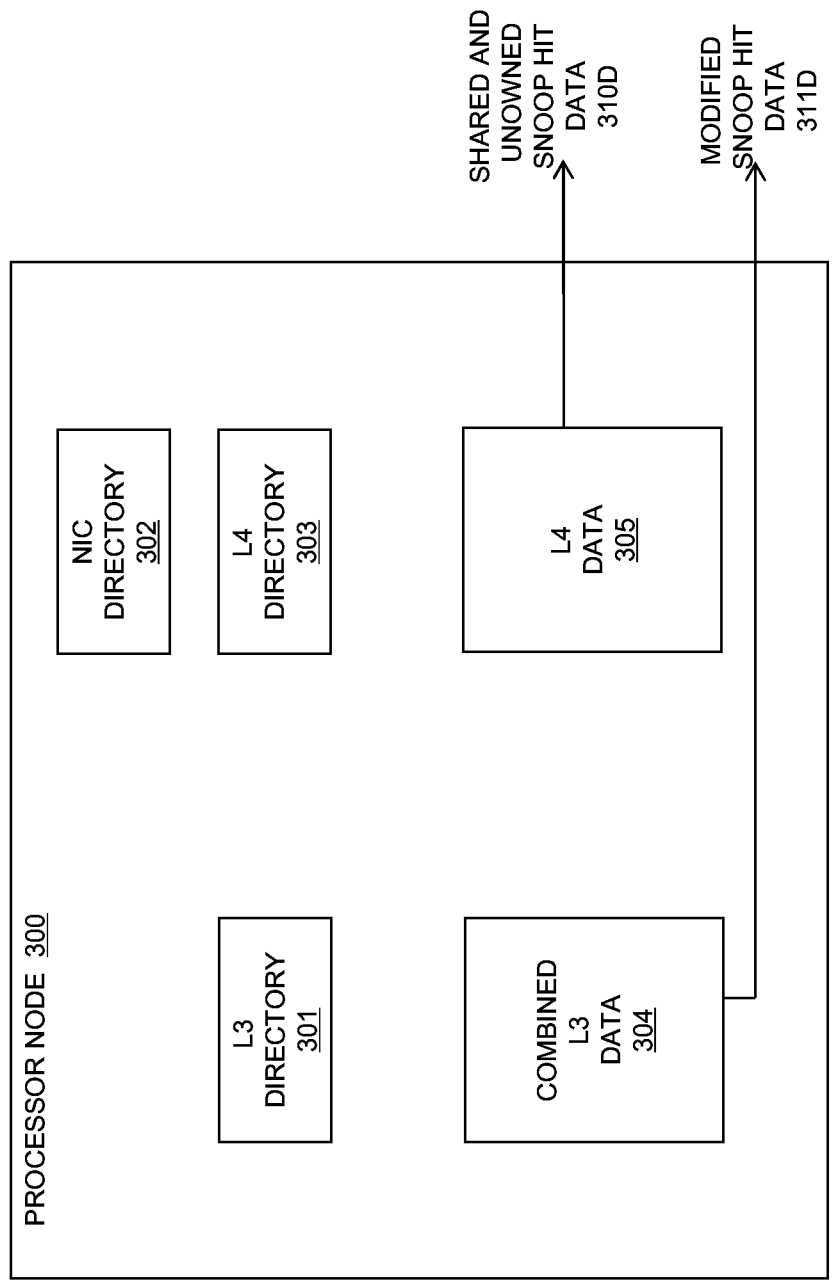

FIGS. 3A-D illustrate various operations that may be performed within an embodiment of a processor node 300 including a NIC directory 302. In processor node 300 that is shown in FIGS. 3A-D, L3 directory 301 may be a directory that is located in any of L3 caches 202A-N of FIG. 2, and includes addresses for data that is held in the particular L3 cache. NIC directory 302 may comprise NIC directory 213 of FIG. 2. L4 directory may be located in L4 cache 201 of FIG. 2, and includes addresses of the data in the L4 cache; the L4 cache data is located in L4 data 305. Combined L3 data 304 comprises all the data located in all of the L3 caches 202A-N. FIG. 3A shows an embodiment of a snoop 310A that is received by the processor node 300 from the SMP bus. The snoop address is checked against the NIC directory 302 and the L4 directory 303, and if there is a L3-owned hit in either NIC directory 302 or the L4 directory 303, a cross interrogation 311A is sent from either the NIC directory 302 or the L4 directory 303 to the L3 directory 301 that owns the data requested by the snoop. FIG. 3B shows an embodiment of a fetch from a core in the processor node 300 that misses in the L3 directory 301. The L3 miss address 310B is sent from the L3 directory 301 the L4 directory 303, and is then broadcast as a snoop 311B on the SMP bus. The snoop may be either an exclusive snoop or a shared snoop, depending on whether the data is intended to be modified or not. Data 312B is returned from the SMP bus in response to the snoop, and installed in both combined L3 data 304 and L4 data 305. FIG. 3C shows an embodiment of installation of data from the L4 cache in the L3 cache in the processor node 300. The install data 310C is sent from L4 data 305 to combined L3 data 304. In order to install data 310C in combined L3 data 304, an entry, comprising L3 data 311C, is evicted from combined L3 data 304 and installed in L4 data 305. FIG. 3D shows an embodiment of data sourcing in response to a snoop hit in the processor node 300. Shared and unowned data 310D is sourced from L4 data 305 on a snoop hit, while modified data is sourced from combined L3 data 304 on a snoop hit.

Figure 4:
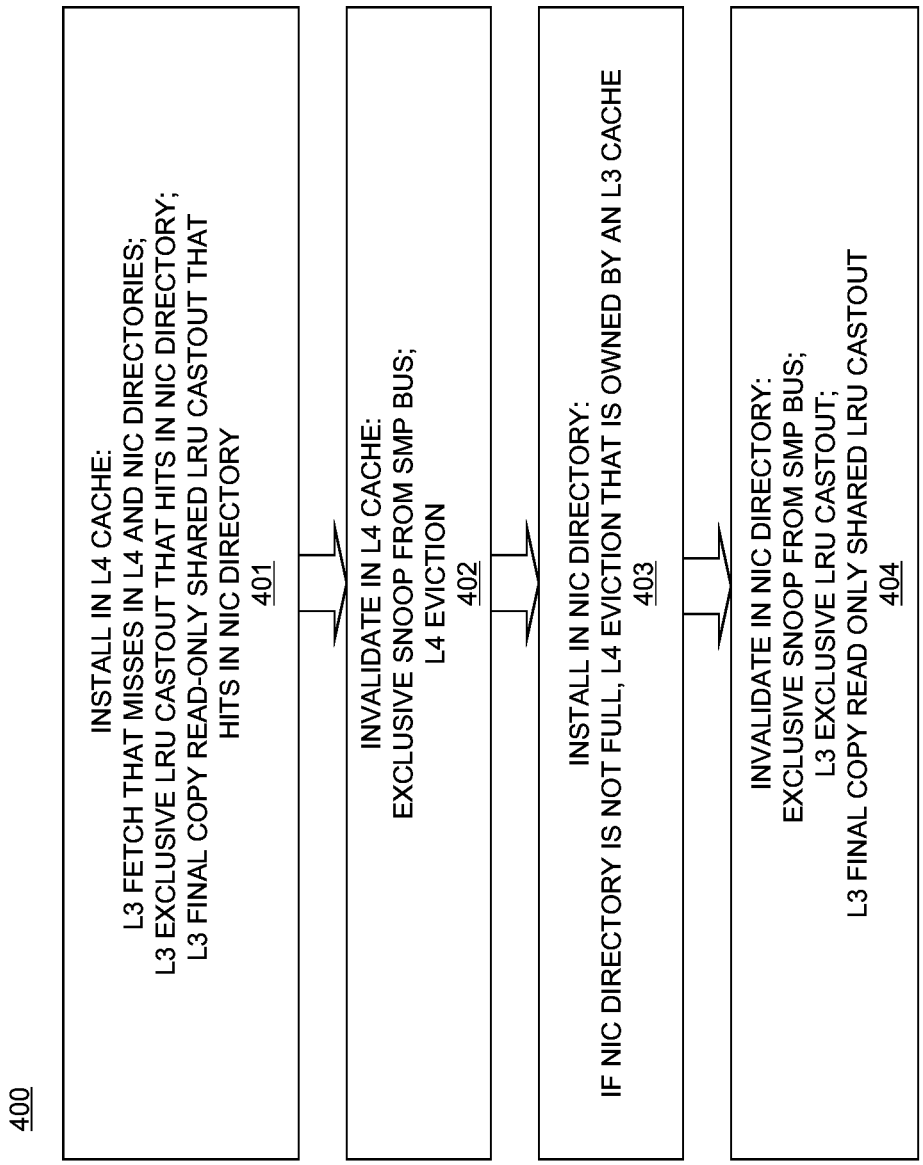
FIG. 4 depicts a process flow for line address installations and invalidations in a processor node including a L4 cache and NIC directory in accordance with an embodiment.

FIG. 4 depicts a method 400 for line address installations and invalidations in a processor node including a L4 cache and NIC directory in accordance with an embodiment. In block 401, the following entry types are installed in the L4 cache: L3 fetches that miss in the L4 and NIC directories; L3 exclusive evictions or castouts (based on, for example, L3 least recently used, or LRU replacement policy) that hit in the NIC directory; and L3 read-only shared LRU castouts that hit in NIC directory and is a final copy of data, i.e., is not owned by any other L3 in the same processor node. In block 402, the following entry types are invalidated in the L4 cache, by, for example, setting the validity bit in the entry's line in the L4 directory to invalid: exclusive snoops from the SMP Bus; and L4 eviction. In block 403, the following entry type is installed in the NIC directory if the NIC directory is not full: L4 evictions that are owned by a L3 cache. In block 404, the following entry types are invalidated in the NIC directory by, for example, setting the validity bit in the entry's line in the NIC directory to invalid: lines that are hit by exclusive snoops from the SMP Bus; L3 exclusive LRU castouts; and L3 read-only shared LRU castouts that hit in NIC directory and do not hit in another L3 cache. Entries in the L4 cache and NIC directory that have a validity bit set to invalid may be overwritten by an installation that is performed according to blocks 401 or 403, and an invalidation according to blocks 402 or 404 may be triggered by an installation that is performed according to blocks 401 or 403.

Figure 5:
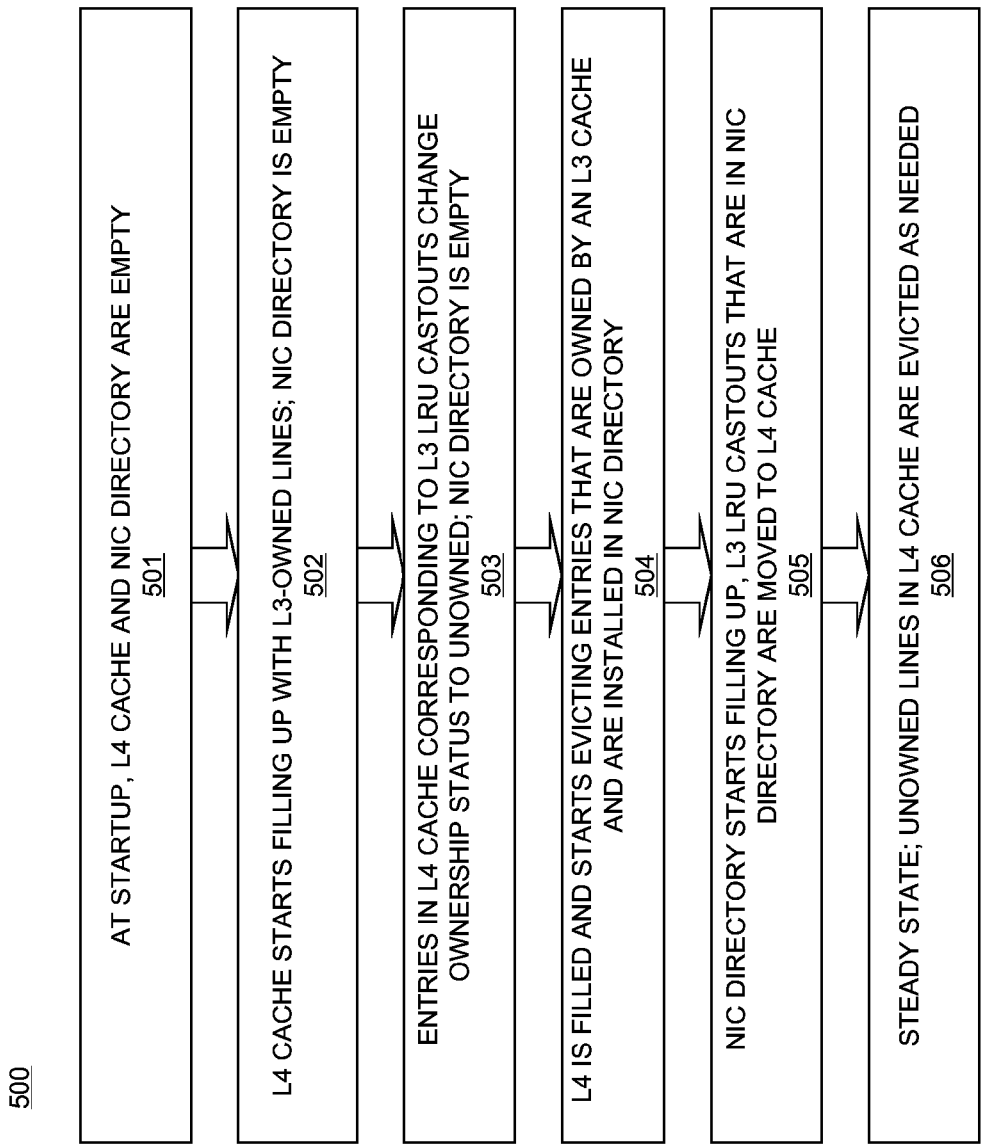
FIG. 5 depicts a process flow for operation of a processor node including a NIC directory in accordance with an embodiment.

FIG. 5 depicts a method 500 for operation of a processor node including a NIC directory in accordance with an embodiment. First, in block 501, the SMP starts up, and the L4 cache and NIC directory in the processor node are empty. Next, in block 502, as the SMP begins executing instructions, initial lines are installed in the L4 cache. The L4 cache is initially filled with cache lines that are marked IM=1 and owned by a L3 cache in the processor node, and the NIC directory is empty. Then, in block 503, in embodiments in which the L4 cache is larger than the combined L3 caches, the L3 caches will start to cast out LRU data before the L4 cache is full. The ownership status of lines in the L4 cache corresponding to these L3 cache LRU castouts is updated to unowned. At this point, the L4 cache contains mostly owned lines, with some unowned lines; the NIC directory is still empty. Flow then proceeds to block 504, in which, as the SMP continues to perform work, the L4 cache fills up and starts evicting entries to make room for new entries. Evictions from the L4 cache that are owned by a L3 cache are moved to the NIC directory. This preserves lines that are owned by a L3 cache in the caching structure. At this point, the L4 cache contains a mixture of L3-owned and unowned lines, and the NIC directory has some L3-owned lines. Next, in block 505, the NIC directory is filling up, and L3 cache LRU castouts start hitting in the NIC directory. The L3 LRU castouts that hit in the NIC directory are moved to the L4 cache. The L4 cache may make room for a L3 LRU castout that hits in the NIC directory by selecting an entry in the L4 cache that is owned exclusively by a L3 cache to be moved to the NIC directory. If such an entry is not available in the L4 cache, the L4 cache may select an entry for which IM=0 and ownership is shared (MC=1) by one or more L3s. If such an entry is not available in the L4 cache, the L4 cache may select an entry that IM=1 and ownership is shared (MC=1) by one or more L3s. At this point, the L4 cache may have more unowned lines than owned lines, and the NIC directory has more owned lines. Lastly, in block 506, a steady state is achieved, and most of the lines owned by a L3 cache within the processor node are now in the NIC directory, and the L4 cache holds mainly unowned lines, which may be evicted to make room for new entries as needed. The L3-owned lines that remain in the L4 cache may have IM=1 and MC=1 tags, allowing for relatively fast responses to interventions requesting data to be transferred to other processor nodes that are received on the SMP bus.

Figure 6:
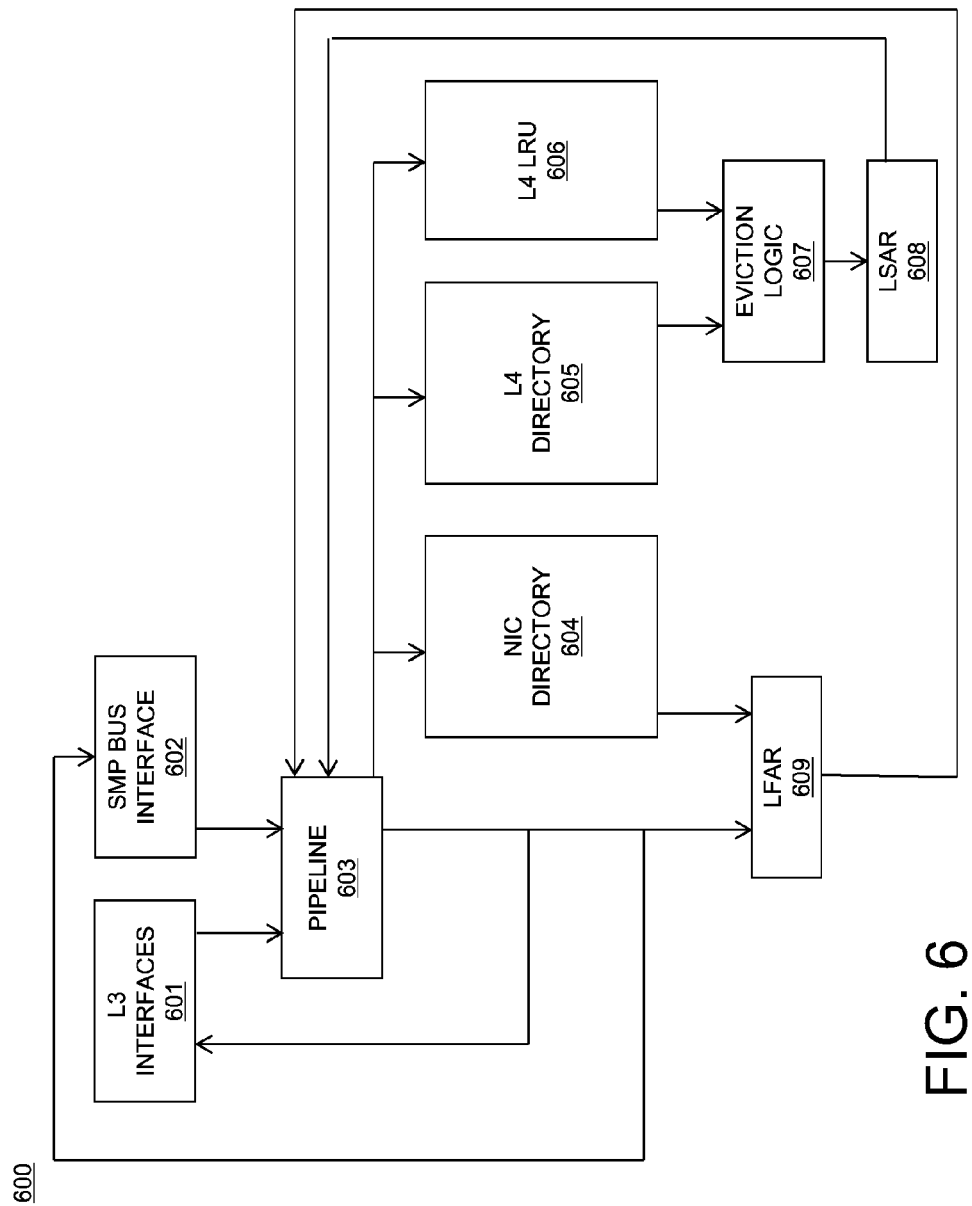
FIG. 6 depicts a processor node including a NIC directory in accordance with an embodiment.

FIG. 6 depicts a processor node 600 including a NIC directory in accordance with another embodiment. Processor node 600 includes L3 interfaces 601, SMP bus interface 602, pipeline 603, NIC directory 604, L4 directory 605, L4 LRU 606, eviction logic 607, local store address registers (LSAR) 608, and local fetch address register (LFAR) 609. L3 interfaces 601 may be in communication with any appropriate number of L3 caches in the processor node 600. SMP bus interface 602 is in communication with a SMP bus that links a plurality of processor nodes in a SMP. L4 LRU 606 tracks the LRU entries in the L4 directory 605, and is used by eviction logic 607 to determine entries to evict from the L4 directory 605 and not from the NIC directory 604, as NIC directory 604 does not need to evict for entry replacement. Elements 601-609 of processor node 600 may be included in the various embodiments of processor nodes 103A-N, 200, and 300 that are shown in FIGS. 1, 2, and 3A-D. FIGS. 7-15, which describe embodiments of various operations that are performed in a processor node including a NIC directory, are discussed below with respect to processor node 600 of FIG. 6.

Figure 7:
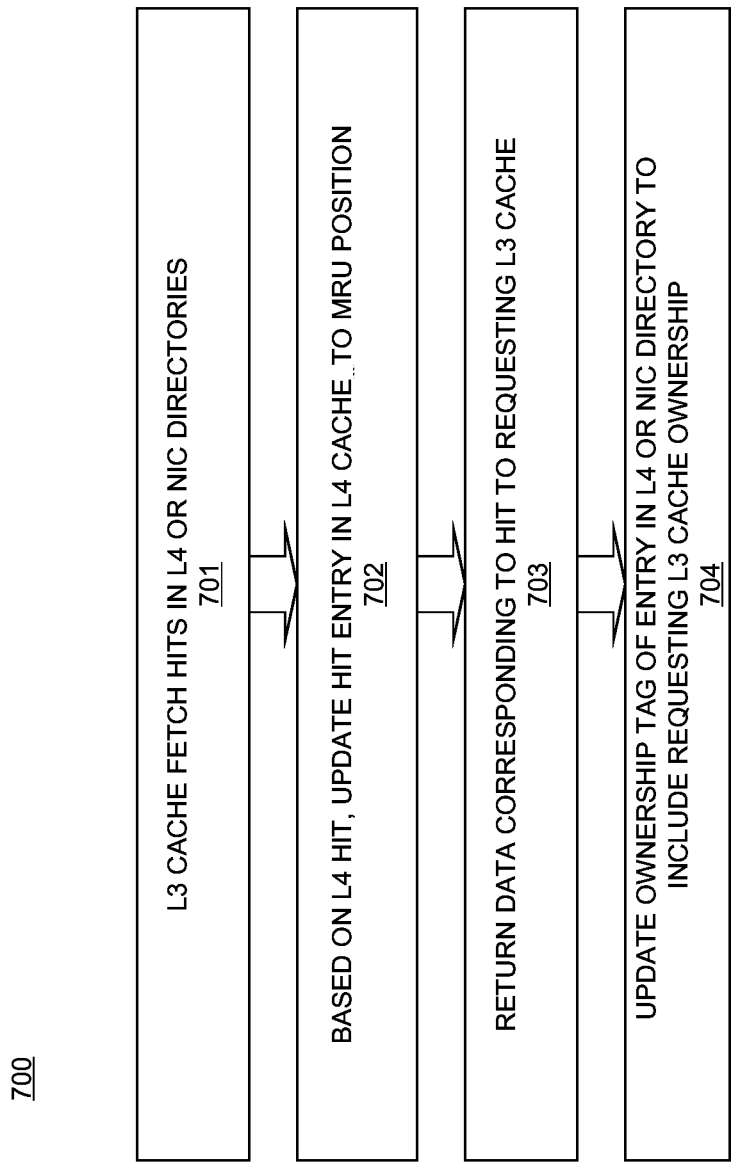
FIG. 7 depicts a process flow for a L3 cache fetch that hits in the L4 or NIC directories in accordance with an embodiment.

FIG. 7 depicts a method 700 for a L3 fetch that hits in the L4 or NIC directories in accordance with an embodiment. First, in block 701, a L3 fetch from a requesting L3 cache goes from L3 interfaces 601 into pipeline 603, and hits in the L4 directory 605 or the NIC directory 604. Then, in block 702, based on the hit being in the L4 directory 605, the hit entry is set to the most recently used (MRU) position in the L4 directory 605. Next, in block 703, the L3 fetch goes back into pipeline 603 to return the fetch data back to the requesting L3 via L3 interfaces 601. On a NIC directory hit, data is returned from another L3 cache within the processor node. Lastly, in block 704, the ownership tag of the hit entry is updated in either the NIC directory 604 or L4 directory 605 to reflect the requesting L3 cache.

Figure 8:
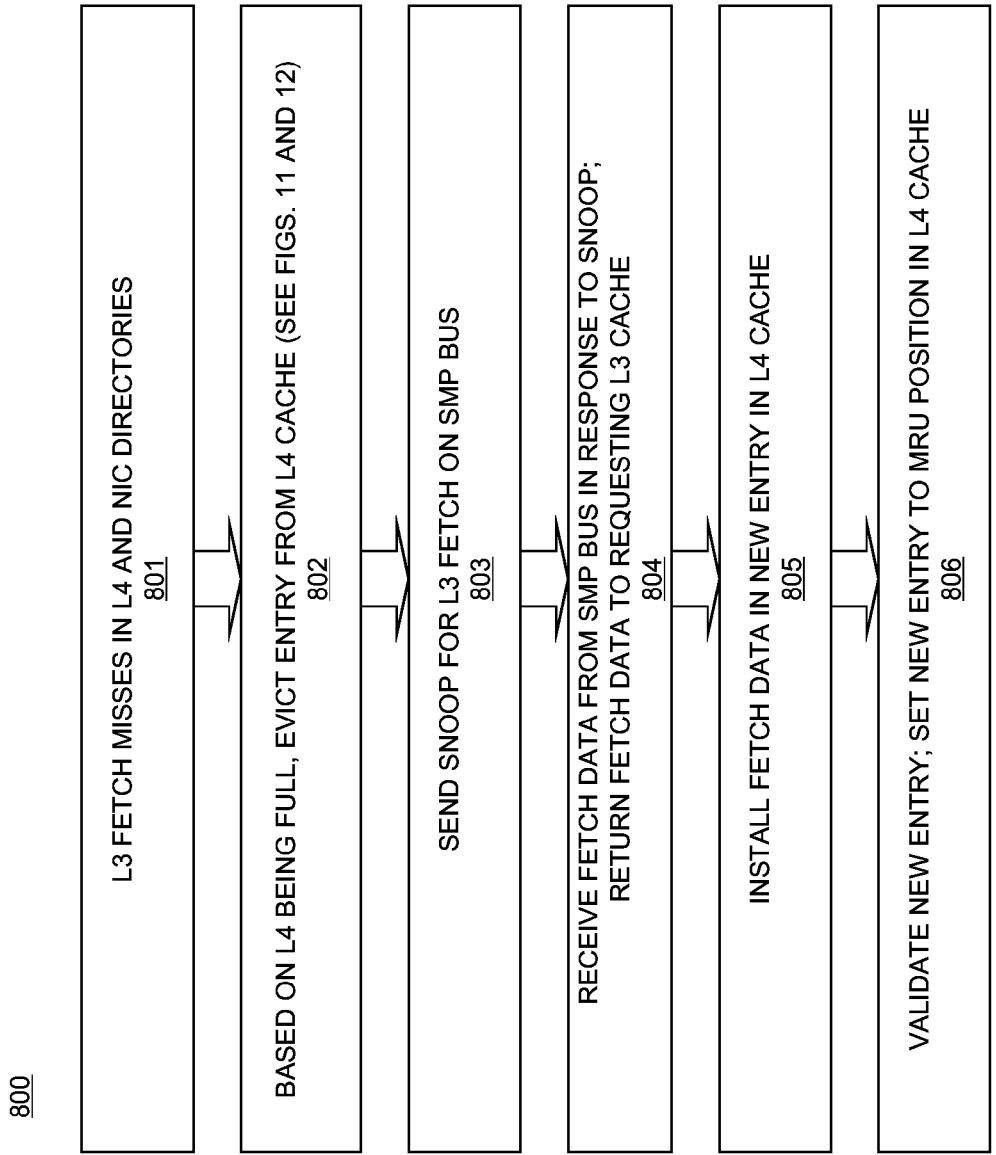
FIG. 8 depicts a process flow for a L3 cache fetch that misses in the L4 and NIC directories in accordance with an embodiment.

FIG. 8 depicts a method 800 for a L3 fetch that misses in the L4 and NIC directories in accordance with an embodiment. First, in block 801, a L3 fetch from a requesting L3 cache goes from L3 interfaces 601 into pipeline 603, and misses the L4 directory 605 and the NIC directory 604. Next, in block 802, based on the L4 cache being full, an entry is evicted from the L4 cache to make room for a new entry; this is discussed in further detail below with respect to FIGS. 11 and 12. Then, in block 803, a snoop is sent to the SMP bus for the L3 fetch via LFAR 609, pipeline 603, and SMP bus interface 602. Next, in block 804 the fetch data is returned on the SMP bus via SMP bus interface 602 in response to the snoop, and is sent to the requesting L3 cache via L3 interfaces 601. In block 805 a new entry is created in the L4 directory 605 for the returned fetch data. Lastly, in block 806, the new entry in the L4 directory 605 is validated and updated into the MRU position.

Figure 9:
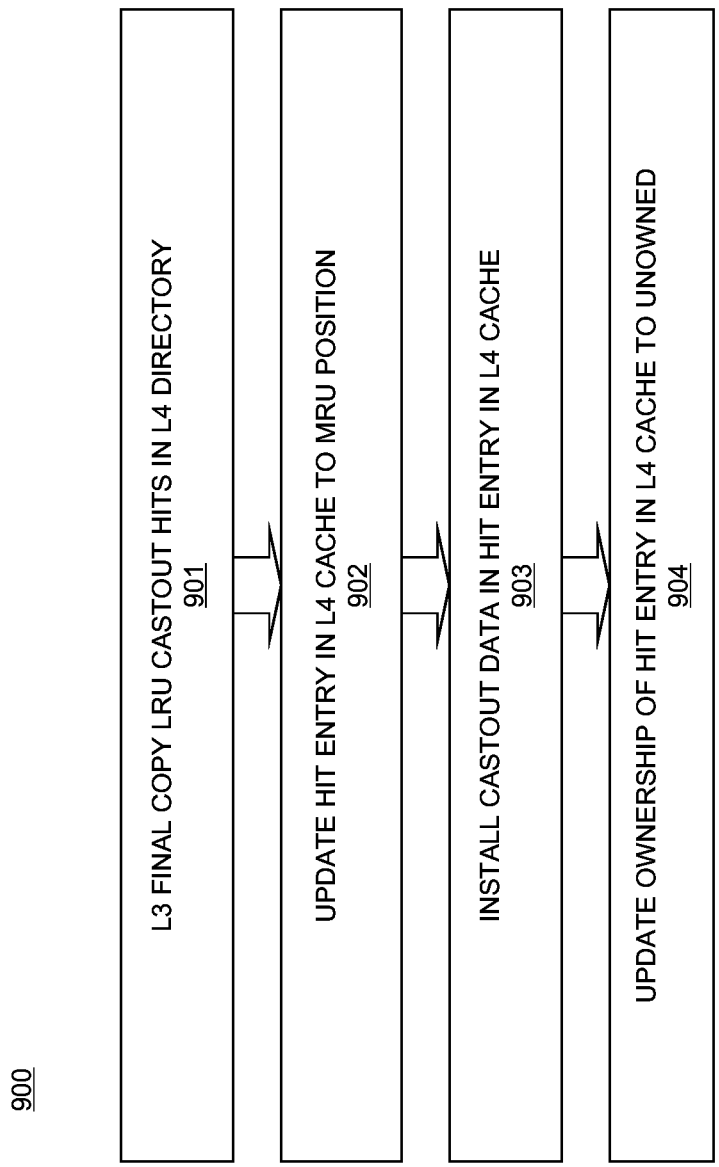
FIG. 9 depicts a process flow for a L3 cache eviction castout that hits in the L4 directory in accordance with an embodiment.

FIG. 9 depicts a method 900 for a final copy L3 castout that hits in the L4 directory in accordance with an embodiment. First, in block 901, an entry is cast out, or evicted, from a L3 directory (based on, for example, the L3 LRU), and this castout entry hits in the L4 directory 605. Next, in block 902, the hit entry is set to the MRU position in L4 directory 605. Then, in block 903, the castout data is installed in the hit entry in the L4 cache. Lastly, in block 904, the ownership tag of the hit entry in the L4 directory 605 is updated to unowned.

Figure 10:
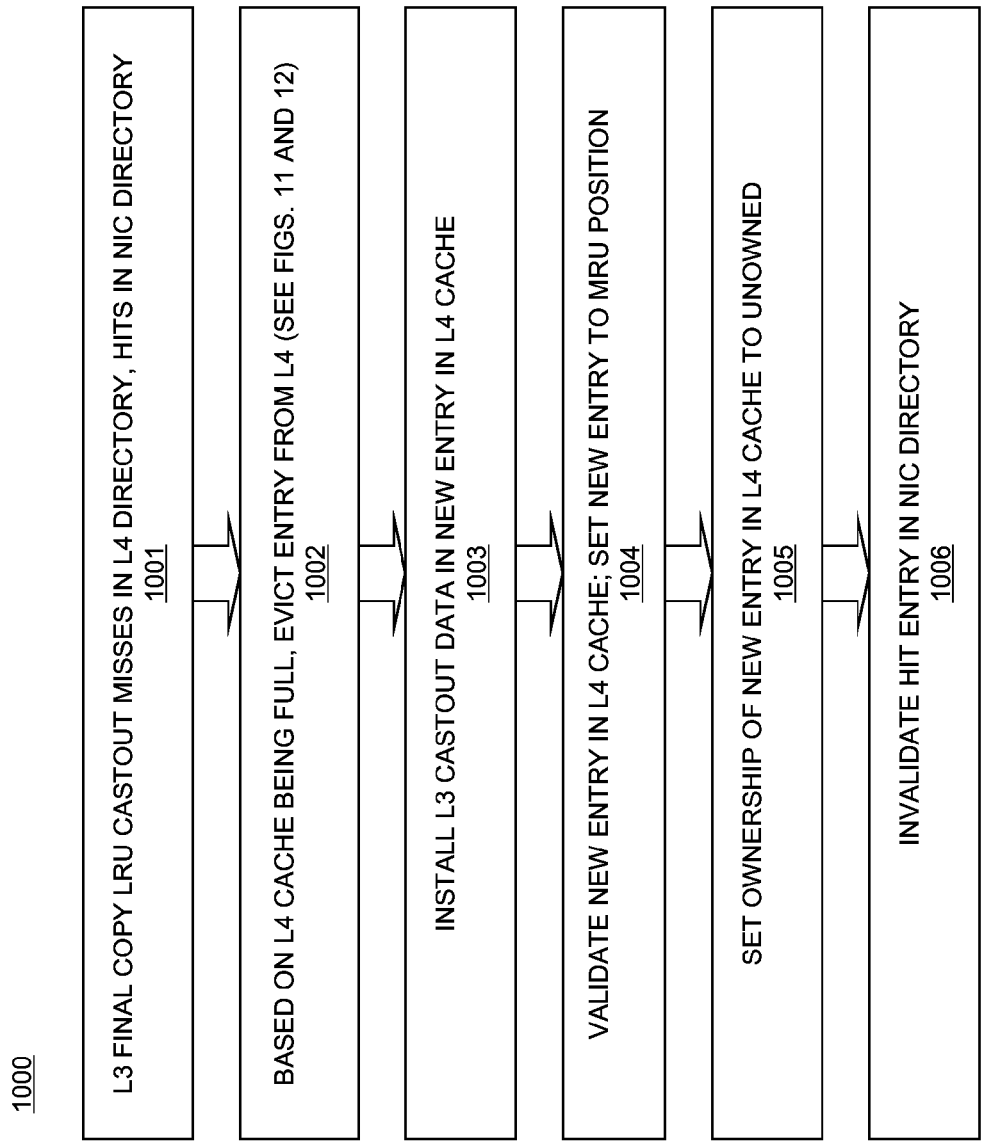
FIG. 10 depicts a process flow for a L3 cache eviction castout that misses in the L4 directory and hits in the NIC directory in accordance with an embodiment.

FIG. 10 depicts a method 1000 for a final copy L3 castout that misses in the L4 directory and hits in the NIC directory in accordance with an embodiment. First, in block 1001, an entry is cast out, or evicted, from the L3 directory (based on, for example, the L3 LRU) and this castout entry misses in the L4 directory 605 but hits in the NIC directory 604. Then, in block 1002, based on the L4 cache being full, an entry is evicted from the L4 cache to make room for a new entry corresponding to the L3 castout; this is discussed in further detail below with respect to FIGS. 11 and 12. Next, in block 1003, the address and data of the L3 castout entry are installed in a new entry in the L4 cache. In block 1004, the new entry is validated and set to the MRU position in the L4 directory 605. In block 1005, the ownership tag of the new entry in the L4 director 605 is set to unowned. Lastly, in block 1006, the hit entry in the NIC Directory 604 is invalidated.

FIG. 11 depicts a method 1100 for eviction of an entry from the L4 cache to the NIC directory in accordance with an embodiment. First, in block 1101, it is determined that the L4 cache is full and an eviction is needed from the L4 cache to make room for a new entry, and that the NIC directory 604 has room for a new entry. Next, in block 1102, the eviction logic 607 selects an entry from the L4 directory 605 for eviction. Any L3 exclusively owned entry in the L4 directory 605 is selected first; if no L3 exclusively owned entry exists in the L4 directory 605, any shared entry with IM=0 is selected; if no shared entry with IM=0 exists in the L4 directory 605, any shared entry with IM=1 is selected by the eviction logic 607. Next, in block 1103, the selected entry is installed and validated in the NIC directory 604. Lastly, in block 1104, the selected entry is invalidated in the L4 directory 605.

Figure 12:
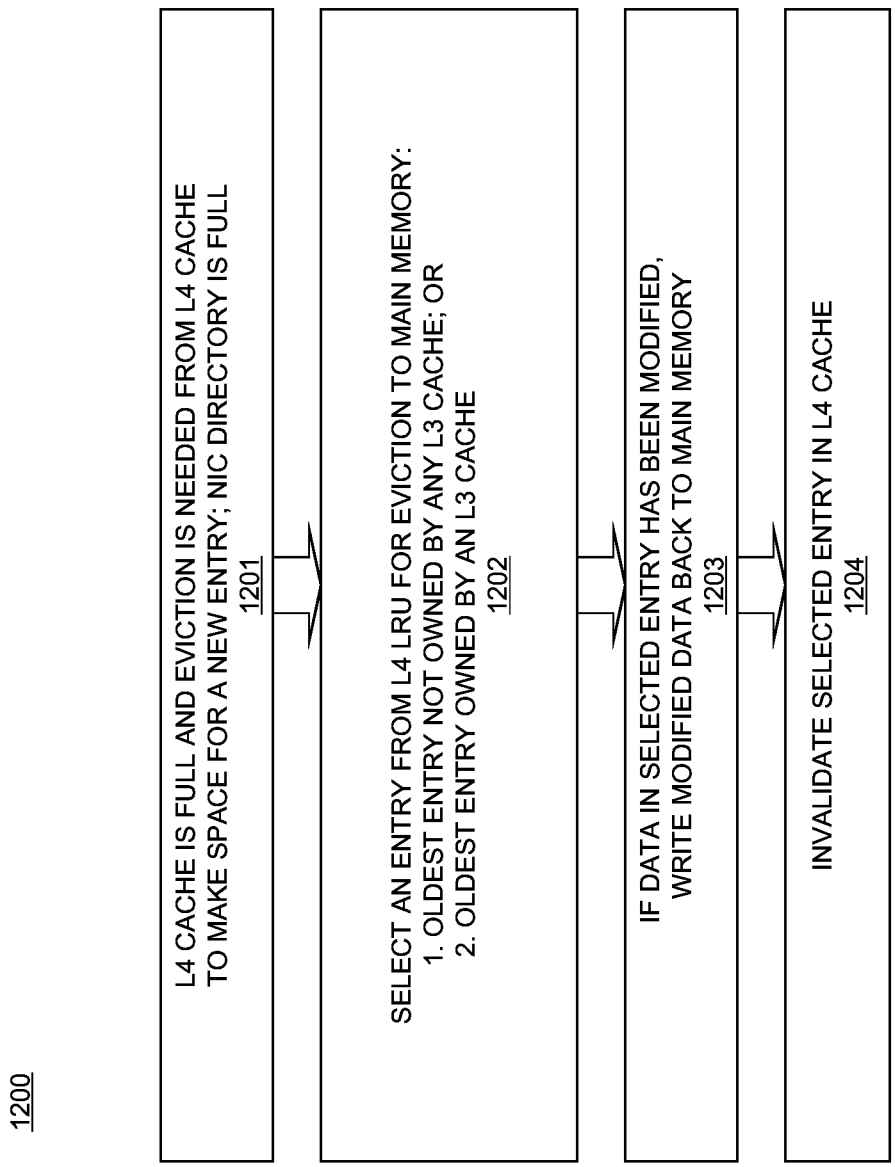
FIG. 12 depicts a process flow for eviction from the L4 cache to main memory in accordance with an embodiment.

FIG. 12 depicts a method 1200 for eviction of an entry from the L4 cache to the main memory in accordance with an embodiment. First, in block 1201, it is determined that the L4 cache is full and an eviction is needed from the L4 cache to make room for a new entry, and that the NIC directory 604 is also full. Next, in block 1202, the eviction logic 607 selects an entry based on L4 LRU 606 information for eviction from the L4 directory 605. The oldest entry in the L4 directory 605 that is not owned by any L3 cache is selected first; if no entry that is not owned by any L3 cache exists in the L4 directory 605, the oldest entry in the L4 directory 605 that is owned by a L3 cache is selected by the eviction logic 607. Then, in block 1203, if the data in the evicted entry has been modified, the modified data is written back to the main memory. Lastly, in block 1204, the selected entry is invalidated in the L4 directory 605.

Figure 13:
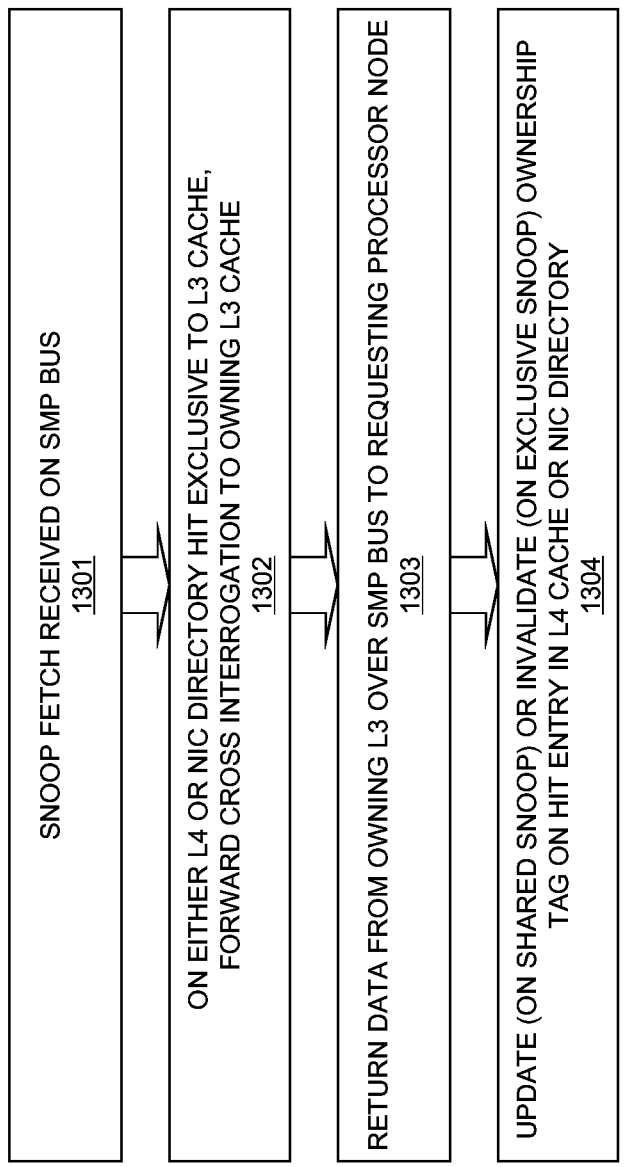
FIG. 13 depicts a process flow for a snoop fetch that hits exclusively to a L3 cache in accordance with an embodiment.

FIG. 13 depicts a method 1300 for a snoop fetch in accordance with an embodiment. First, in block 1301, a snoop fetch is received from another processor node on the SMP bus via SMP bus interface 602. Next, in block 1302, the snoop hits exclusive to a L3 cache in either the NIC directory 604 or the L4 directory 605, and a cross interrogation is forwarded to the owning L3 via L3 interfaces 601. Then, in block 1303, the fetch data that was retrieved by the cross interrogation is sent on the SMP bus via SMP bus interface 602 to the requesting processor node. Lastly, in block 1304, the ownership tag of the entry in the NIC directory 604 or the L4 directory 605 corresponding to the snoop hit is updated to shared or invalidated based on the snoop fetch type.

Figure 14:
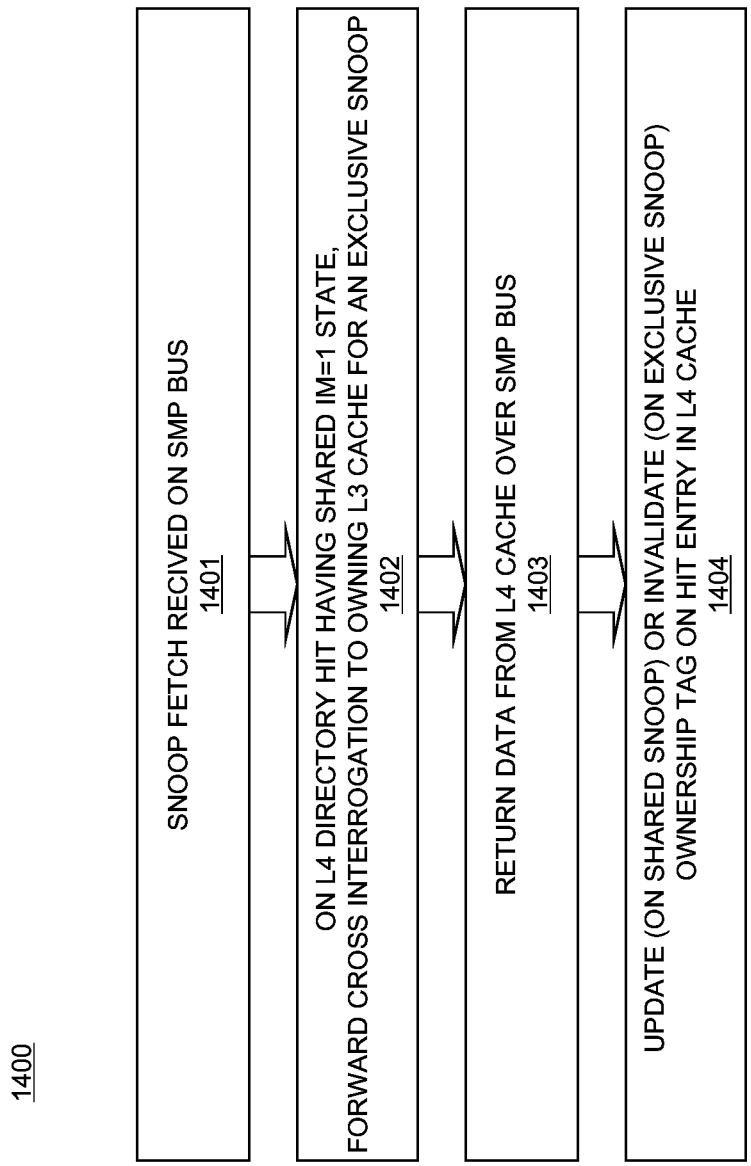
FIG. 14 depicts a process flow for a snoop for a L3 cache shared fetch that hits in L4 directory in accordance with an embodiment.

FIG. 14 depicts a process flow for a snoop fetch that hits in L4 in accordance with an embodiment. First, in block 1401, a snoop fetch is received from another processor node on the SMP bus via SMP bus interface 602. Next, in block 1402, the snoop hits in the L4 directory 605 having a shared IM=1 state, and a cross interrogation is forwarded to the owning L3(s) via L3 interfaces 601 for an exclusive snoop to invalidate the L3(s). Then, in block 1403, the fetch data is accessed from the L4 cache and is sent on the SMP bus via SMP bus interface 602 to the requesting processor node. Lastly, in block 1404, the ownership tag of the entry in the L4 directory 605 corresponding to the hit is either updated to shared (for a shared snoop) or invalidated (for an exclusive snoop), based on the snoop fetch type.

Figure 15:
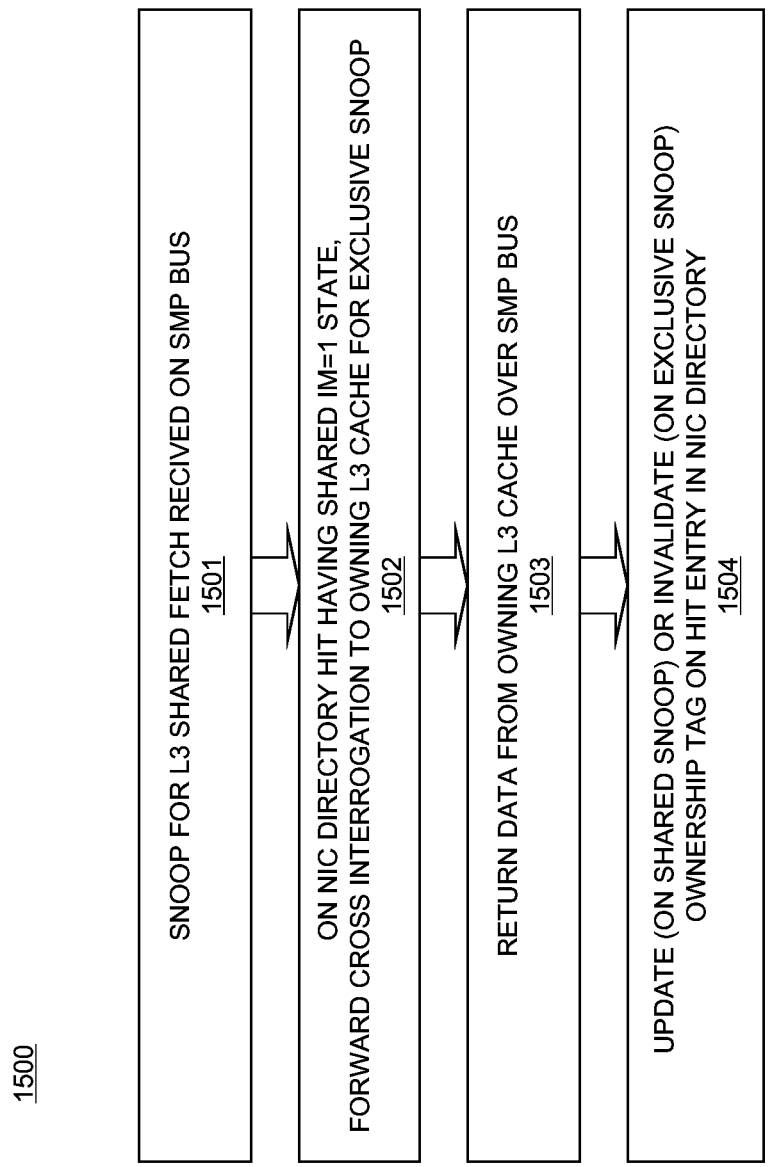
FIG. 15 depicts a process flow for a snoop for a L3 shared fetch that hits in the NIC directory in accordance with an embodiment.

FIG. 15 depicts a method 1500 for a snoop fetch that hits in the NIC directory in accordance with an embodiment. First, in block 1501, a snoop fetch is received from another processor node on the SMP bus via SMP bus interface 602. Next, in block 1502, the snoop hits in the NIC directory 604 having a shared IM=1 state, and a cross interrogation is forwarded to the owning L3(s) via L3 interfaces 601. Then, in block 1503, the fetch data that was retrieved by the cross interrogation is sent on the SMP bus via SMP bus interface 602 to the requesting processor node. Lastly, in block 1504, the ownership tag of the entry in the NIC directory 604 corresponding to the hit is updated to shared (for a shared snoop) or invalidated (for an exclusive snoop), based on the snoop fetch type.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 16:
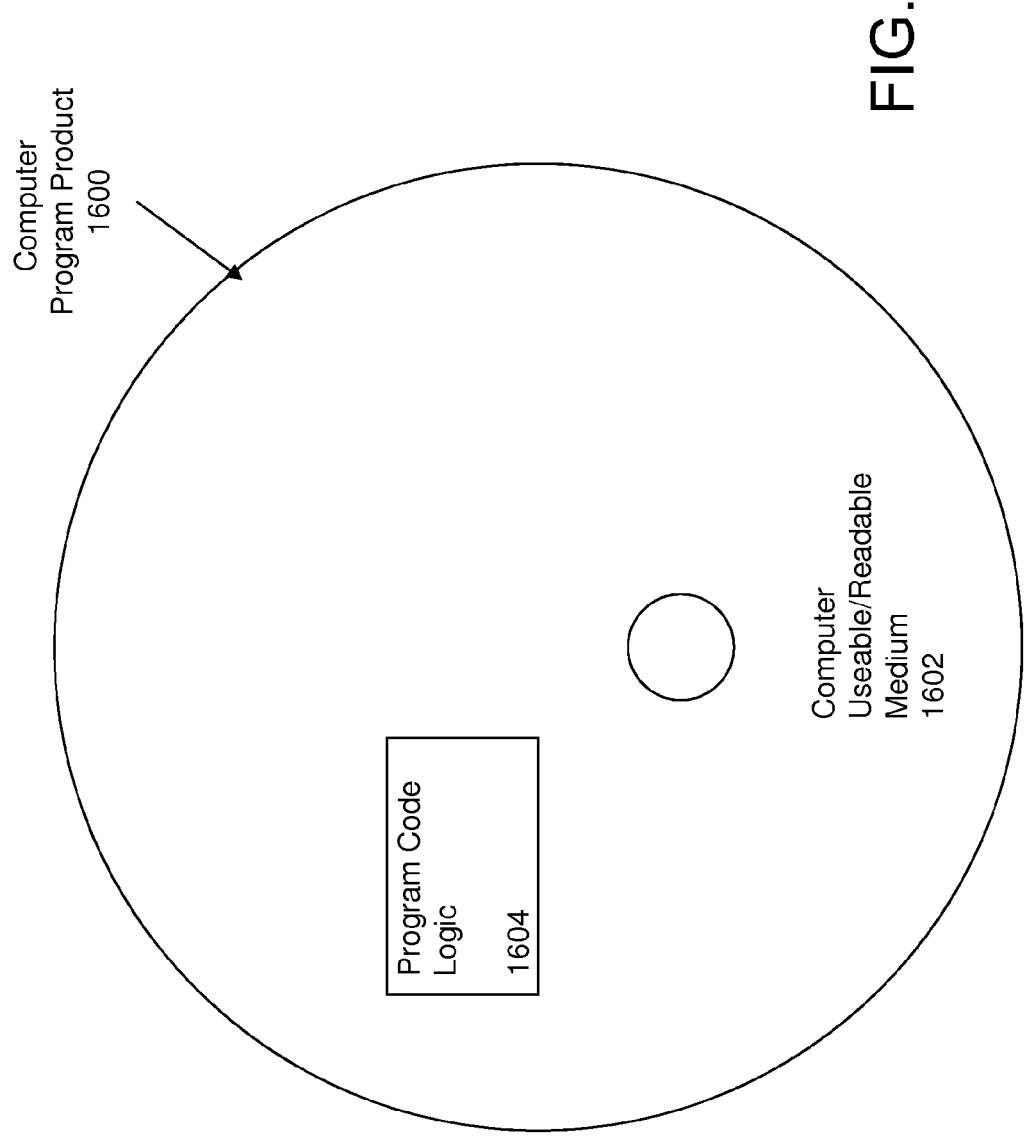
FIG. 16 illustrates a computer program product in accordance with an embodiment.

Referring now to FIG. 16, in one example, a computer program product 1600 includes, for instance, one or more storage media 1602, wherein the media may be tangible and/or non-transitory, to store computer readable program code means or logic 1604 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include interception of snoops by higher-level caches in a processor node of a SMP.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer implemented method for operation of a non-data inclusive coherent (NIC) directory for a symmetric multiprocessor (SMP) of a computer, the method comprising:
   determining a first eviction entry of a highest-level cache in a multilevel caching structure of a first processor node of the SMP;
   determining that the NIC directory is not full;
   determining that the first eviction entry of the highest-level cache is owned by a lower-level cache in the multilevel caching structure;
   based on the NIC directory not being full and based on the first eviction entry of the highest-level cache being owned by the lower-level cache, installing an address of the first eviction entry of the highest-level cache in a first new entry in the NIC directory; and
   invalidating the first eviction entry in the highest-level cache;
   determining a second eviction entry in the lower-level cache in the multilevel caching structure;

determining that an entry corresponding to the second eviction entry is located in the NIC directory;

determining that an entry corresponding to the second eviction entry is not located in another lower-level cache in the multilevel caching structure;

based on the entry corresponding to the second eviction entry being located in the NIC directory and based on no entry corresponding to the second eviction entry being located in another lower-level cache of the multilevel caching structure, creating a second new entry corresponding to the second eviction entry in the highest-level cache; and invalidating the entry corresponding to the second eviction entry in the NIC directory.

2. The method of claim 1, further comprising:

setting the second new entry in the highest-level cache to a most recently used (MRU) position; and setting an ownership of the second new entry in the highest-level cache to unowned.

3. The method of claim 1, further comprising:

based on the NIC directory being full and based on a least recently used (LRU) unowned entry existing in the highest-level cache, evicting to a main memory of the computer system the LRU unowned entry; and based on the NIC directory being full and based on a least recently used (LRU) unowned entry not existing in the highest-level cache, evicting an LRU owned entry of the highest-level cache to the main memory of the computer system.

4. The method of claim 1, further comprising:

receiving a snoop by the first processor node from a second processor node of the SMP via a SMP bus;

determining that an entry corresponding to the snoop is located in the NIC directory;

retrieving data corresponding to the snoop from the lower-level cache; and forwarding the retrieved data to the second processor node via the SMP bus.

5. The method of claim 4, wherein the snoop comprises an exclusive snoop, and further comprising:

invalidating the entry corresponding to the exclusive snoop in the NIC directory.

6. The method of claim 4, wherein the snoop comprises a shared snoop, and further comprising:

updating to shared ownership of the entry corresponding to the shared snoop in the NIC directory.

7. The method of claim 1, wherein the highest-level cache and the NIC directory are in communication with a plurality of lower-level caches in the multilevel caching structure;

wherein the highest-level cache comprises a directory comprising entries corresponding to a first plurality of addresses, and data associated with the first plurality of addresses in the directory; and wherein the NIC directory comprises entries corresponding to a second plurality of addresses, and wherein the NIC directory does not comprise data associated the second plurality of addresses.

8. The method of claim 1, wherein determining the first eviction entry of the highest-level cache of the first processor node of the SMP comprises:

based on an entry that is exclusively owned by the lower-level cache existing in the highest-level cache, selecting the entry that is exclusively owned by the lower-level cache as the first eviction entry;

based on an entry that is exclusively owned by the lower-level cache not existing in the highest-level cache, and based on a shared entry having an unset intervention master (IM) tag existing in the highest-level cache, selecting the shared entry having the unset IM tag as the first eviction entry; and based on a shared entry having an unset IM tag not existing in the highest-level cache, selecting a shared entry having a set IM tag as the first eviction entry.

9. A computer program product for implementing a non-data inclusive coherent (NIC) directory for a symmetric multiprocessor (SMP) of a computer, the computer program product comprising:

a tangible non-transitory storage medium readable by a processing circuit and storing instructions for execution by the processing circuit for performing a method comprising:

determining a first eviction entry of a highest-level cache in a multilevel caching structure of a first processor node of the SMP;

determining that the NIC directory is not full;

determining that the first eviction entry of the highest-level cache is owned by a lower-level cache in the multilevel caching structure;

based on the NIC directory not being full and based on the first eviction entry of the highest-level cache being owned by the lower-level cache, installing an address of the first eviction entry of the highest-level cache in a first new entry in the NIC directory; and invalidating the first eviction entry in the highest-level cache;

determining a second eviction entry in the lower-level cache in the multilevel caching structure;

determining that an entry corresponding to the second eviction entry is located in the NIC directory;

determining that an entry corresponding to the second eviction entry is not located in another lower-level cache in the multilevel caching structure;

based on the entry corresponding to the second eviction entry being located in the NIC directory and based on no entry corresponding to the second eviction entry being located in another lower-level cache of the multilevel caching structure, creating a second new entry corresponding to the second eviction entry in the highest-level cache; and invalidating the entry corresponding to the second eviction entry in the NIC directory.

10. The computer program product of claim 9, further comprising:

setting the second new entry in the highest-level cache to a most recently used (MRU) position; and setting an ownership of the second new entry in the highest-level cache to unowned.

11. The computer program product of claim 9, further comprising:

based on the NIC directory being full and based on a least recently used (LRU) unowned entry existing in the highest-level cache, evicting to a main memory of the computer system the LRU unowned entry; and based on the NIC directory being full and based on a least recently used (LRU) unowned entry not existing in the highest-level cache, evicting an LRU owned entry of the highest-level cache to the main memory of the computer system.

* * * * *